United States Patent
Watanabe et al.

(10) Patent No.: US 8,044,938 B2
(45) Date of Patent: Oct. 25, 2011

(54) INPUT DEVICE WITH IMPROVED TOUCH PANEL SURFACE AND ELECTRONIC DEVICE HAVING THE INPUT DEVICE

(75) Inventors: Takeshi Watanabe, Fukushima-ken (JP); Takayuki Chida, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 784 days.

(21) Appl. No.: 11/773,315

(22) Filed: Jul. 3, 2007

(65) Prior Publication Data
US 2008/0122793 A1    May 29, 2008

(30) Foreign Application Priority Data

Jul. 7, 2006    (JP) .................. 2006-187989

(51) Int. Cl.
*G06F 3/041* (2006.01)
(52) U.S. Cl. ...................................... 345/173
(58) Field of Classification Search .................. 345/156, 345/173, 174, 178, 179, 184
See application file for complete search history.

(56) References Cited

U.S. PATENT DOCUMENTS

| | | | |
|---|---|---|---|
| 7,443,388 B1 * | 10/2008 | Novak | 345/173 |
| 2005/0110772 A1 * | 5/2005 | Kong et al. | 345/174 |
| 2006/0022952 A1 * | 2/2006 | Ryynanen | 345/173 |

FOREIGN PATENT DOCUMENTS

| | | |
|---|---|---|
| JP | 6-83537 A | 3/1994 |
| JP | 08-241646 | 9/1996 |
| JP | 2002-214586 | 7/2002 |
| JP | 2003-157150 | 5/2003 |
| JP | 2004-213187 | 7/2004 |
| JP | 2005-222397 | 8/2005 |
| JP | 2005-242501 A | 9/2005 |
| WO | WO2005064451 A1 | 7/2005 |

OTHER PUBLICATIONS

Office Action dated Jul. 20, 2008 for Chinese Patent Application No. 2007101283154.
Office Action issued in corresponding Japanese Patent Application No. 2006-187989; mailed Oct. 12, 2010.

\* cited by examiner

*Primary Examiner* — Richard Hjerpe
*Assistant Examiner* — Jeffrey Parker
(74) *Attorney, Agent, or Firm* — Brinks Hofer Gilson & Lione (57) ABSTRACT

To provide a thin input device capable of preventing foreign materials from entering into a gap between an input panel and a chassis and thus preventing malfunctioning of the input panel. A first detection base 3 is made of a thin material and has a planar size larger than a second detection base 4. A chassis 8 includes a side portion 9 opposed to a side surface of a touch panel 2 and a supporting portion 10 opposed to a bottom surface. The touch panel 2 is received in the inside of the chassis 8 in a state where an inner surface 3a of the first detection base 3 is opposed to a top surface 9a on an input side of the side portion 9 of the chassis so as to cover a gap 14 between the side portion 9 of the chassis 8 and a side surface of the touch panel 2 with the first detection base 3 from the input side of the chassis 8. The inner surface 3a of the first detection base 3 is attached to the top surface 9a of the side portion 9.

24 Claims, 4 Drawing Sheets

INPUT DEVICE WITH IMPROVED TOUCH PANEL SURFACE AND ELECTRONIC DEVICE HAVING THE INPUT DEVICE

CROSS-REFERENCE TO RELATED PATENT APPLICATION

This application claims the priority of Japanese Patent Application No. 2006-187989, filed on Jul. 7, 2006, the entire contents of which are incorporated herein by reference.

BACKGROUND OF THE INVENTION

1. Field of the Invention

The present invention relates to an input device having an input panel to which data can be inputted by means of input units such as pen-shaped writing instruments or fingertips and a chassis receiving the input panel.

2. Description of the Related Art

Recently, input panels such as touch panels or tablets to which data can be inputted by means of input units such as pen-shaped writing instrument or fingertips approaching or contacting thereto have been widely used as data input units in electronic apparatuses such as PDAs (Personal Digital Assistants) or game machines.

Figure 7:
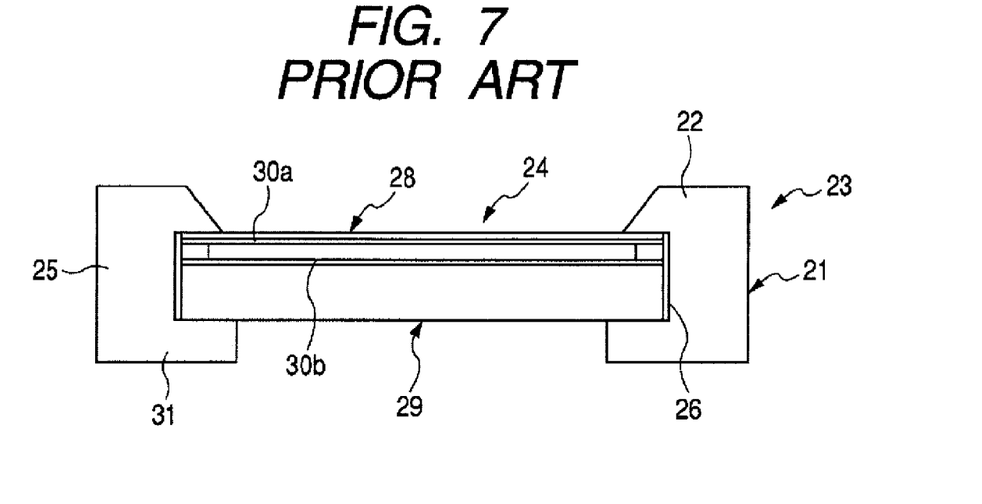
FIG. 7 is a schematic sectional view illustrating an example of a known input device.

As a method of detecting coordinate information so as to input data to the input panel, there have been known various methods of various types including a resistor film type, an electromagnetic induction type, an electrostatic type, an ultrasonic type, and an optical type. FIG. 7 is a schematic sectional view illustrating an example of a known input device having a resistor film type input panel. As shown in FIG. 7, a pair of detection bases 28 and 29 is opposed to each other in an input panel 24 with a predetermined gap. In the inner surfaces of the detection bases 28 and 29 which are opposed to each other, a plurality of resistor films 30a and 30b are formed by a resistor film made of a light-transmitting material. In addition, when a predetermined portion of the first base 28 disposed on the input side of the input panel 24 is pressed by a writing instrument (not shown), the first detection base 28 is bent so that the resistor film 30a of the first detection base 28 comes in contact with the resistor film 30b of the second detection base 29 disposed on the anti-input side. The input panel 24 detects coordinate information of the contact point on the basis of a resistance ratio between the resistor film 30a and the resistor film 30b at the contact point, and data based on the coordinate information is inputted to the input device.

An input device 23 having the input panel 24 includes a chassis 21 for receiving the input panel 24. The chassis 21 includes a side portion 25 opposed to the side surfaces of the input panel 24, a top wall 22 opposed to an outer peripheral edge of the top surface of the input side to press the top surface of the input panel 24, and a supporting portion 31 opposed to a bottom surface of the anti-input side to support the input panel 24. The chassis 21 receives the input panel 24 in its inner space (see JP-A-2003-157150 for reference).

Figure 8:
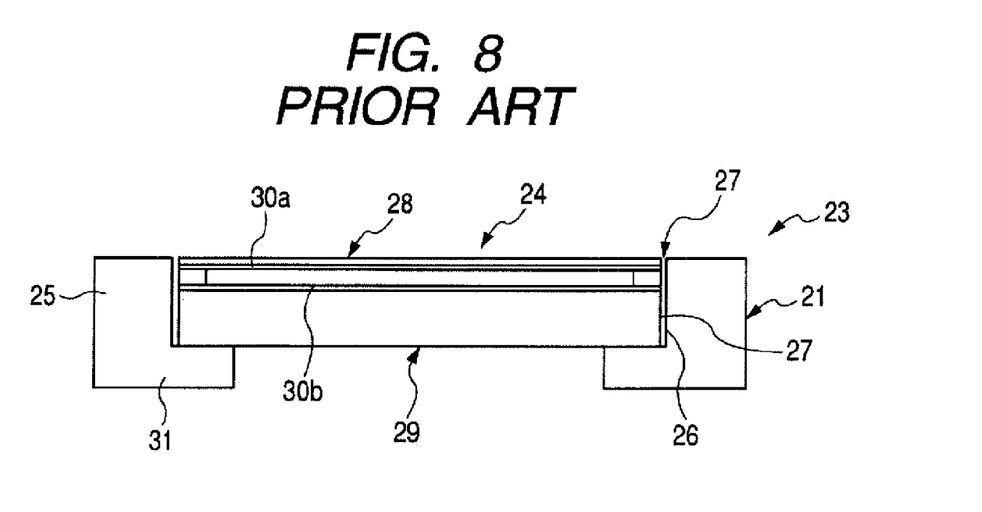
FIG. 8 is a schematic sectional view illustrating another example of the known input device.

With the recent trend toward small and thin electronic apparatuses such as game machines having the above-mentioned input device 23, the input device 23 itself is requested to have small thickness. Accordingly, for example, as shown in FIG. 8, it has been tried to realize the small-thickness of the input device 23 by eliminating the top wall 22 of the chassis 21.

However, when the input panel 24 is received in the chassis 21 not having the top wall 22, there is a possibility that foreign materials 27 such as dust or moisture enters into a gap between a side surface of the input panel 24 and the side portion 25 of the chassis 21. In such a case, for example, moisture may enter into the inside of the input panel 24 together with foreign materials entering into the gap between the input panel 24 and the chassis 21. For this reason, the input panel 24 may have a short circuit between the resistor film 30a and the resistor film 30b. As a result, malfunctioning of the input panel 24 may be caused.

SUMMARY OF THE INVENTION

The present invention solves the above-mentioned problems. An object of the invention is to provide a thin input device capable of preventing foreign materials from entering into a gap between an input panel and a chassis and thus preventing malfunctioning of the input panel.

According to an aspect of the invention, an input device includes an input panel in which a pair of detection bases is opposed to each other and to which data can be inputted by means of an input unit and a chassis receiving the input panel. The first detection base disposed on an input side of both detection bases is made of a thin material and has a planar size larger than that of the second detection base disposed on an anti-input side thereof. The chassis includes a side portion opposed to a side surface of the input panel and a supporting portion opposed to a bottom surface of the input panel, and wherein the input panel is received in the chassis in a state where an inner surface on the anti-input side of the first detection base is opposed to a top surface on the input side of the side portion so as to cover a gap between the side portion and the side surface of the input panel with the first detection base from the input side of the chassis.

In the input device according to the above aspect of the invention, since the gap between the side portion of the chassis and the side surface is covered with the first detection base, it is possible to prevent foreign materials such as dust or moisture from entering into the gap between the input panel and the chassis without needing to form a top wall in the chassis in order to cover the top surface of the input panel. In addition, since the first detection base is formed by the thin material, it is possible to realize a thin-input device.

According to another aspect of the invention, the inner surface of the first detection base is attached to the top surface of the side portion.

In the input device according to the above aspect of the invention, the inner surface of the first detection base is attached to the top surface of the side portion. Accordingly, it is possible to fix the input panel to the chassis and thus to prevent the input panel from falling down in the chassis, thereby preventing foreign materials from entering into the gap between the input panel and the chassis in a more secure manner.

According to a further aspect of the invention, a first detector is formed on the inner surface side of the first detection base and a second detector is formed on the inner surface side which is the input side of the second detection base. A gap in the side portion between the first detector and the second detector is kept at a predetermined size, and a slope inclined toward the inside of the chassis in which the input panel is disposed is formed in the top surface of the side portion, in which a contact portion with the inner surface of the first detection base is a base end of the slope.

In the input device according to the above aspect of the invention, the top surface of the side portion is inclined up to the height of the top surface on the input side in the second detector, in which the contact portion with the inner surface of the first detection base is a base end of the slope. Therefore, when the first detection base is pressed in the vicinity of the outermost edge of an input area of the input panel, the first detection base is bent along the slope. Accordingly, it is possible to prevent excessive bending of the first detection base. As a result, it is possible to prevent cracking of the first detector formed in the bending portion of the first detection base.

According to a still further aspect of the invention, the slope is inclined up to the height of the top surface on the input side in the second detector, in which the contact portion with the inner surface of the first detection base is a base end of the slope.

In the input device according to the above aspect of the invention, the top surface of the side portion is inclined up to the height of the top surface on the input side in the second detector, in which the contact portion with the inner surface of the first detection base is a base end of the slope. Therefore, when the first detection base is pressed in the vicinity of the outermost edge of an input area of the input panel, the first detection base is bent along the slope. Accordingly, it is possible to prevent excessive bending of the first detection base. As a result, it is possible to prevent cracking of the first detector formed in the bending portion of the first detection base.

According to a still further aspect of the invention, the side portion includes a protrusion protruding from the input panel side so as to be disposed in a gap between the inner surface of the first detection base and the inner surface of the second detection base in which the second detector is formed. A part in the second detection base other than the portion opposed to the protrusion includes an upper end portion having a height greater than that of the other part in the second detection base. The height of the distal end of the slope is set to be a height of the top surface on the input side of the second detector formed on the upper end portion.

In the input device according to the above aspect of the invention, since the upper end portion is formed in a predetermined portion of the second detection base, it is possible to control the gap between the first detection base and the second detector in the portion having the upper end portion formed thereon. Accordingly, by controlling the height of the upper end portion, the angle of the slope in the top surface of the protrusion can be maintained at a predetermined angle.

According to a still further aspect of the invention, a surface on the anti-input side of the protrusion is attached to the inner surface of the second detection base.

In the input device according to the above aspect of the invention, since the protrusion is attached to the inner surface of the second detection base, it is possible to fix the input panel to the chassis and thus to prevent foreign materials from entering into the gap between the input panel and the chassis in a more secure manner.

According to a still further aspect of the invention, a decoration layer is provided on the outer periphery on the input side or the anti-input side of the first detection base.

In the input device according to the above aspect of the invention, it is easy to identify the outer periphery of the first detection base which is not opposed to the second detection base from the input side of the input device. Accordingly, malfunctioning of the input device can be prevented in which the input unit such as writing instruments or fingers is brought into contact with the outer periphery of the first detection base, thereby enhancing operability of the input panel of the input device. In addition, it is possible to cover the gap between the side surface of the second detection base and the side portion of the chassis with the decoration layer disposed on the outer periphery of the first detection base. Accordingly, the gap between the side surface of the second detection base and the side portion of the chassis is not observed from the input side of the input device.

According to a still further aspect of the invention, the decoration layer is provided in a non-input area other than the input area of the input panel to which data can be inputted.

In the input device according to the above aspect of the invention, it is easy to identify the input area and the non-input area of the input panel from the input side of the input device. Accordingly, malfunctioning of the input device can be prevented in which the input unit such as writing instruments or fingers is brought into contact with the outer periphery of the first detection base, thereby enhancing operability of the input panel of the input device.

According to a still further aspect of the invention, the decoration layer is provided on the surface on the input side of the first detection base and a decoration film covering the decoration layer is provided on the input side of the first detection base.

In the input device according to the above aspect of the invention, it is easy to identify the input area and the non-input area of the input panel from the input side of the input device. Accordingly, malfunctioning of the input device can be prevented in which the input unit such as writing instruments or fingers is brought into contact with the outer periphery of the first detection base, thereby enhancing operability of the input panel of the input device. In addition, it is possible to protect the decoration layer with the decoration film without exposing the decoration layer to the outside.

As described above, according to the input device of the invention, the first detection base is made of a film and is thinner than that of a top wall of the known chassis. With such a configuration, it is possible to provide a thin input device capable of preventing foreign materials such as dust or moisture from entering into a gap between an input panel and a chassis and thus preventing malfunctioning of the input panel.

BRIEF DESCRIPTION OF THE DRAWINGS

The above and other features and advantages of the present invention will become more apparent by describing in detail exemplary embodiments thereof with reference to the attached drawings in which.

DESCRIPTION OF THE PREFERRED EMBODIMENTS

Embodiments of an input device according to the invention will be described with reference to FIGS. 1 to 6.

Herein, in the embodiment, an input panel having a resistor film type is described. However, the input panel of the invention is not restricted to the embodiment.

Figure 1:
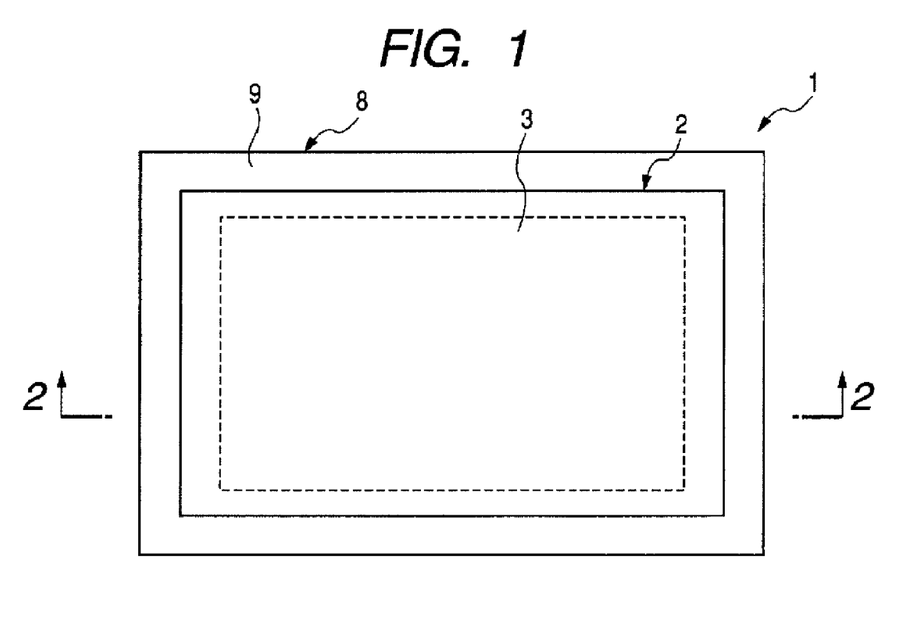
FIG. 1 is a schematic plan view illustrating an input device according to an embodiment of the invention.
Figure 2:
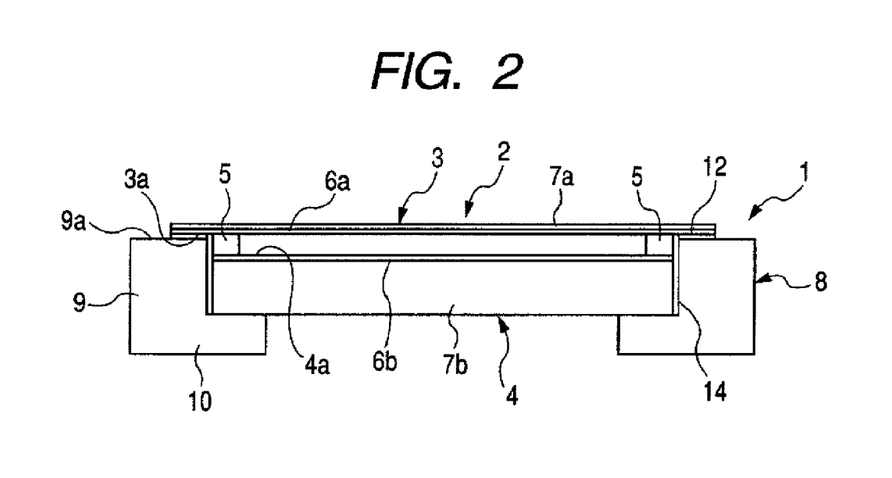
FIG. 2 is a sectional view illustrating the input device of FIG. 1 when viewed from the line 2-2.

FIG. 1 is a schematic plan view illustrating the input device according to the embodiment. FIG. 2 is a sectional view when viewed from the line 2-2 of FIG. 1.

As shown in FIGS. 1 and 2, the input device 1 of the present embodiment includes a touch panel 2. The touch panel 2 includes a pair of detection bases 3 and 4 made of a light-transmitting material. The first detection base 3 disposed on an input side of the input device 1 includes a first base 7a formed of a flexible thin film made of materials such as polyester. Meanwhile, the second base 4 disposed on the anti-input side includes a second base 7b formed of a substrate made of transparent resin materials such as glass or acryl. The first base 7a has a planar size larger than the second base 7b.

On the opposing inner surfaces of the bases 7a and 7b, resistor films 6a and 6b made of light-transmitting materials such as indium tin oxide are formed as the first detector and second detector. The respective coordinate detection voltages are applied to the resistor films 6a and 6b. In addition, a spacer (not shown) is formed in the surface on the input side of the resistor film 6b formed on the second detection base 4 so that a gap between the first detection base 3 and the second detection base 4 is kept at a predetermined size.

The detection bases 3 and 4 respectively having the resistor film 6a and 6b are opposed to each other with a predetermined gap at a position where the outer peripheral edge of the first detection base 3 protrudes from the outer peripheral edge of the second detection base 4. The detection bases 3 and 4 are formed integrally through a bonding layer 5 disposed on the outer peripheral edge in an inner surface 4a of the second detection base 4.

In addition, when a predetermined portion of the first base 3 disposed in the input side in the touch panel 2 using a writing instrument and a finger, and the like which are not shown is pressed, the first base 3 is bent so that the electrode formed at the first base 3 comes in contact with electrodes of the second base 4. The coordinate information is detected by a resistance ratio between both resistor films 6a and 6b in the contact point and data is inputted in accordance with the coordinate information.

In addition, the input device 1 includes a chassis 8 formed of resin material receiving the touch panel 2. The chassis 8 includes a first base 3 which is a side surface of the touch panel 2, a side portion 9 opposed to a bonding layer and all of the side surface of the second base 4, a supporting wall 10 opposed to the bottom wall supporting the touch panel 2 which is disposed the outer peripheral edge in the surface of the anti-input side of the second base 4, and the side portion 9 and the supporting portion 10 are formed integrally.

In addition, the touch panel 2 is received in the inside of the chassis 8 in a state where the outer peripheral edge in an inner surface 3a of the first detection base 3 is opposed to the inner edge of the inside portion receiving the touch panel 2 of a top surface 9a on the input side of the side portion 9 so as to cover a gap 14 between the side portion 9 of the chassis 8 and a side surface of the touch panel 2 with the first detection base 3 from the input side of the chassis 8. In addition, the outer peripheral edge of the inner surface 3a of the first detection base 3 is attached to the inner edge of the top surface 9a of the side portion 9 by means of an adhesive material 12.

Next, an operation of the first embodiment will be described.

According to the present embodiment, the first base 7a of the first detection base 3 is formed to have a planar size larger than that of the second base 7b. In addition, the touch panel 2 is received in the inside of the chassis 8 in a state where the outer peripheral portion in the inner surface 3a of the first detection base 3 is opposed to the inner edge of the inside portion receiving the touch panel 2 of a top surface 9a on the input side of the side portion 9 so as to cover a gap 14 between the side portion 9 of the chassis 8 and a side surface of the touch panel 2 with the first detection base 3 from the input side of the chassis 8. Since the gap 14 between the side portion 9 of the chassis 8 and the side surface of the touch panel 2 is covered by the first detection base 3 from the input side, it is possible to prevent foreign materials such as dust or moisture from entering into the gap 14 between the touch panel 2 and the chassis 8 without needing to form the top wall to cover the outer peripheral edge of the top surface.

Since the first detection base 3 is made of a film and has a smaller thickness than that of the top wall 22 in the known chassis 21, it is possible to realize the thin input device 1 and prevent foreign materials from entering into the gap 14 between the touch panel 2 and the chassis 8, thereby preventing the malfunctioning of the touch panel 2.

In addition, since the inner surface 3a of the first detection base 3 is attached to the top surface 9a of the side portion 9, the touch panel 2 is fixed to the chassis 8. Thus, the touch panel 2 is prevented from falling down in the chassis 8. Accordingly, it is possible to prevent foreign materials from entering into a space between the touch panel 2 and the chassis 8 in a more secure manner.

Next, an input device 1 according to a second embodiment the invention will be described with reference to FIGS. 3 and 4.

Herein, in the input device according to the second embodiment, the corresponding parts to the first embodiment are indicated by the same reference numerals and the detailed descriptions thereof will be omitted.

Figure 3:
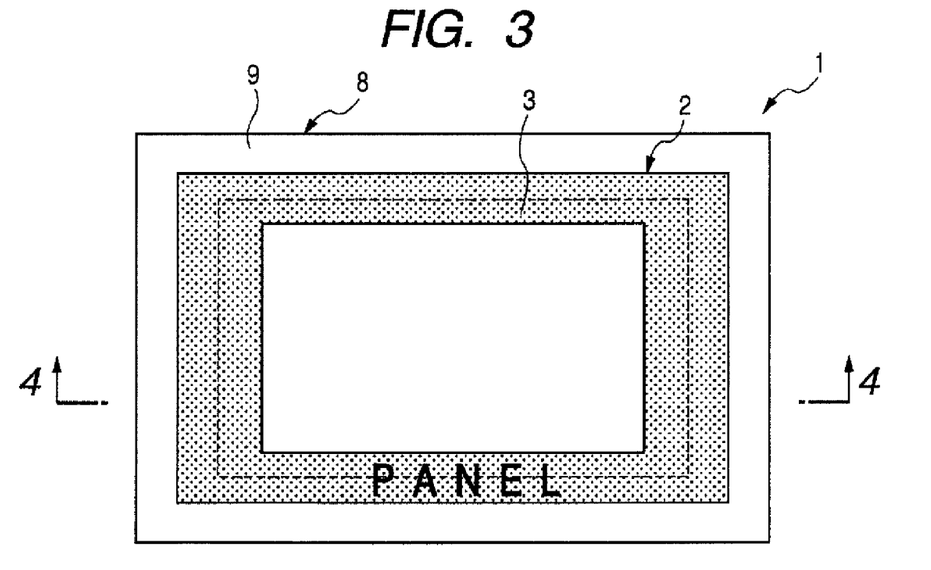
FIG. 3 is a schematic plan view illustrating the input device according to another embodiment of the invention.

FIG. 3 is a schematic plan view illustrating the input device 1 according to the second embodiment. FIG. 4 is a sectional view illustrating the input device 1 shown in FIG. 3 when viewed from the line 4-4.

Figure 4:
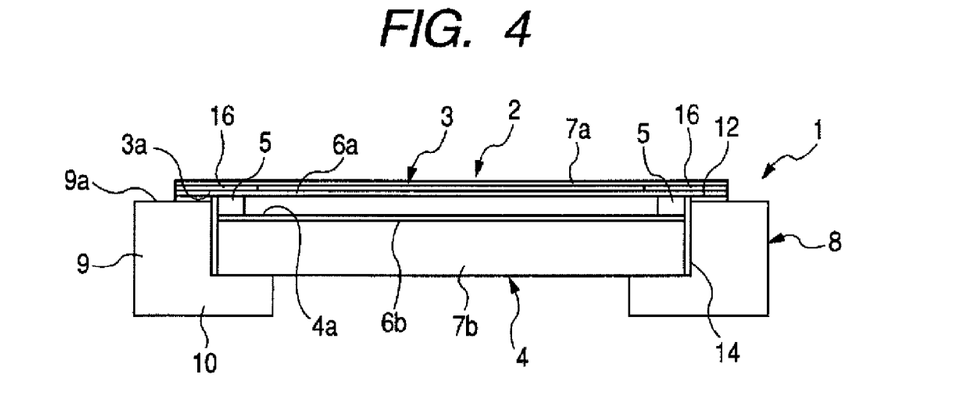
FIG. 4 is a sectional view illustrating the input device when viewed from the line 4-4.

As shown in FIGS. 3 and 4, on the outer periphery of the anti-input surface of the first detection base 3 in the touch panel 2, a decoration layer 16 is formed by printing decorations such as characters or figures. In the present embodiment, among the anti-input side of the first detection base 3 of the touch panel 2, in a non-input area other than an input area capable of inputting data of the touch panel 2, that is, a position where the resistor films 6a and 6b of the inner surface of both detection bases 3 and 4 are not formed or a position where a bonding layer 5 forming both bases 3 and 4 is disposed integrally or in the vicinity of the position, the decoration layer 16 is formed at a position which corresponds to the outer peripheral edge of the touch panel 2.

In addition, the touch panel 2 is received in the inside of the chassis 8 so that the inner surface 3a of the outer peripheral edge of the first detection base 3 is opposed to the top surface 9a of the side portion 9 of the chassis 8 through the decoration layer 16. The inner surface 3a of the first detection base 3 is attached to the top surface 9a of the side portion 9 of the chassis 8 by means of the adhesive material 12 through the decoration layer 16.

Next, an operation of the second embodiment will be described.

According to the embodiment, the decoration layer 16 is provided in the non-input area of the touch panel 2. With such a configuration, from the input side of the input device 1, it is possible that the input area and the non-input area in the touch panel 2 are easily observed.

With such a configuration, the malfunctioning of the input device can be prevented in which the input units such as writing instruments or fingers are brought into contact with the non-input area, thereby enhancing operability of the touch panel 2 of the input device 1.

In addition, similar to the first embodiment, the top wall 22 of the known chassis 21 is not formed, the gap 14 between the touch panel 2 and the chassis 8 is covered with the first detection base 3 of the touch panel 2 which has a smaller thickness than that of the top wall 22, and the touch panel 2 is received to the chassis 8. With such a configuration, it is possible to realize the small-thickness of the input device 1 and prevent foreign materials from entering into the gap 14 between the touch panel 2 and the chassis 8. Accordingly, the malfunctioning of the touch panel 2 can be prevented.

In addition, it is possible to cover the gap 14 between the side surface of the second detection base 4 and the side portion 9 of the chassis 8. With such a configuration, it is also possible that the gap between the side surface of the second detection base 4 and the side portion 9 of the chassis 8 is not observed.

In the second embodiment, the decoration layer 16 is disposed in the surface of the anti-input surface of the first detection base 3. However, the decoration layer 16 of the present invention is not restricted to this.

Figure 5:
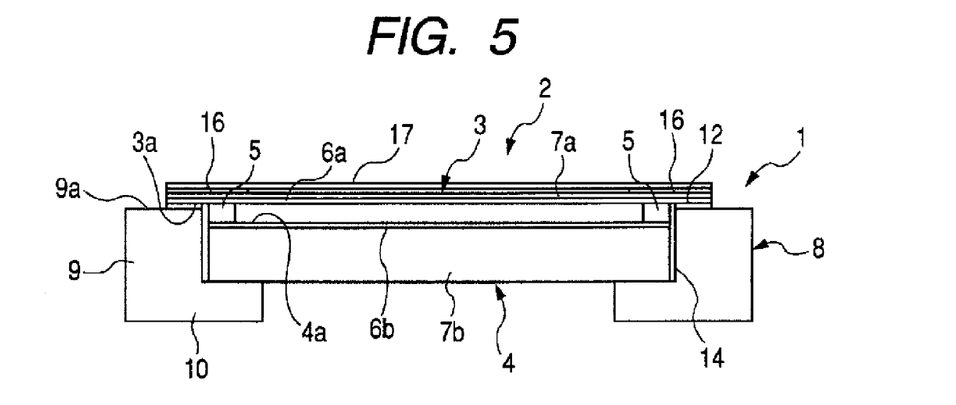
FIG. 5 is a schematic plan view illustrating the input device according to another embodiment of the invention.

FIG. 5 is a schematic sectional view illustrating the input device 1 including the touch panel 2 having the decoration layer 16 according to another embodiment of the invention. As shown in FIG. 5, in the touch panel 2 of the input device 1, the decoration layer 16 is disposed on the input side of the first detection base 3. The touch panel 2 includes a decoration film 17 having the decoration layer 16 in which the characters or shapes are printed in a position corresponding to the non-input area of the touch panel 2. The decoration film 17 is disposed in the input side of the first detection base 3 so that the decoration layer 16 is opposed to the first detection base 3. In the touch panel 2, it is possible that the input area and the non-input area in the touch panel 2 are easily observed. With such a configuration, the malfunctioning of the input device can be prevented in which the input units such as writing instruments, and the like are brought into contact with the non-input area, thereby enhancing operability of the touch panel 2 of the input device 1. In addition, it is possible to protect the decoration layer 16 without exposing the decoration layer by the decoration film 17.

Next, a third embodiment of the input device according to the invention will be described with reference to FIGS. 6 and 7.

Figure 6:
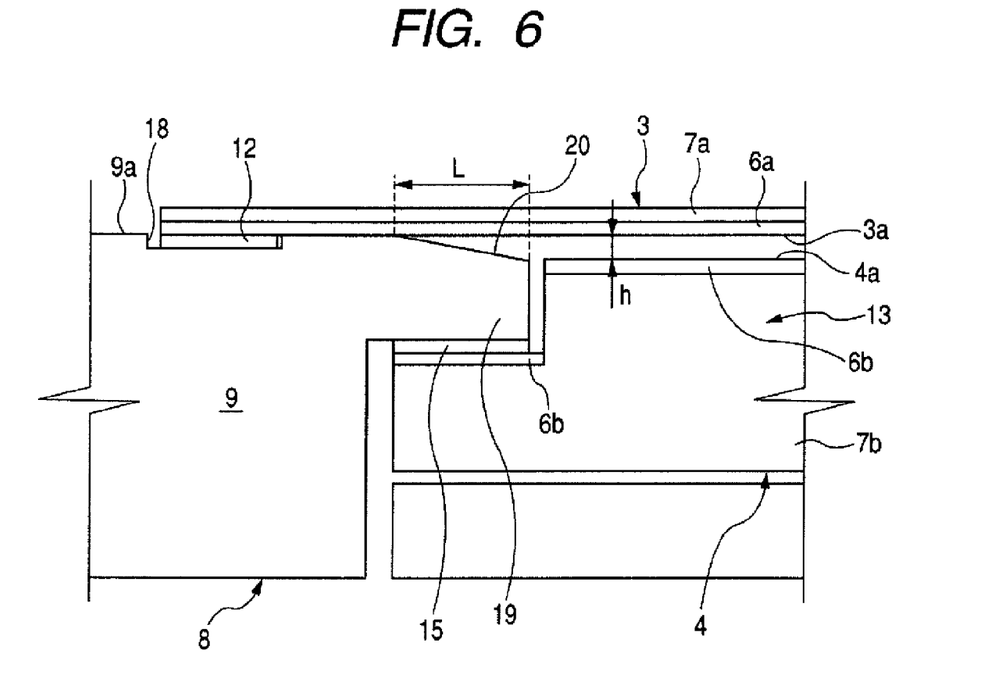
FIG. 6 is a schematic plan view illustrating a main part of the input device according to another embodiment of the invention.

FIG. 6 is a schematic sectional view illustrating a main part of the input device according to the third embodiment. Herein, in the input device according to the third embodiment, the corresponding parts to the first embodiment are indicated by the same reference numerals and the detailed descriptions thereof will be omitted.

As shown in FIG. 6, a concave portion 18 is formed at a position opposed to the outer peripheral edge of the inner surface 3a of the first detection base 3 in which the resistor film 6a among the top surface 9a of the chassis 8 is formed. In the concave portion 18, the adhesive material 12 such as two sides tape is disposed and the inner surface 3a of the first detection base 3 is attached to the top surface 9a of the chassis 8 through the adhesive material 12.

The side portion 9 of the chassis 8 comes in contact with the inner surface 3a of the first detection base 3 and the gap between the first resistor film 6a of the first detection base 3 and the second resistor film 6b of the second detection base 4 is kept at a predetermined gap. In the side portion 9 according to the embodiment, a protrusion 19 is disposed so that the gap between the inner surface 3a of the first detection base 3 and the inner surface 4a of the second detection base 2 is disposed. By the protrusion 19, the gap between the surfaces 3a and 4a, that is, the gap between the first resistor film 6a and the second resistor film 6b is kept at a predetermined size. The configuration in which the gap between the first resistor film 6a and the second resistor film 6b is kept at a predetermined size in the side portion 9 is not restricted to the shape according to the embodiment. For example, in the side portion 9, a supporting portion which supports the anti-input side of the second detection 4 is formed and the inner surface 3a of the first detection base 3 is supported by the top surface 9a of the side portion 9. By the supporting portion, the anti-input side surface of the second detection base 4 is supported so that the gap between the first resistor film 6a and the second resistor film 6b is kept at a predetermined size.

In the top surface 9a of the protrusion 19 of the side portion 9, a slope 20 is disposed in a direction toward the inside of the chassis 8 in which the touch panel 2 is disposed is formed, in which the contact portion with the inner surface 3a of the first detection base 3 is a base end of the slope. In the embodiment, the slope 20 is inclined up to the height of the top surface of the input side in the second resistor film 6b.

In addition, the protrusion 19 is disposed so that the anti-input side of the protrusion 19 is opposed to the inner surface 4a of the second detection base 4 (the inner surface of the second resistor film 6b, in the embodiment) and protrudes from the touch panel 2 side of the side portion 9 of the chassis 8. The surface of the anti-input side in the protrusion 19 is attached to the inner surface 4a of the second detection base 4 by means of the adhesive material 15.

An upper end portion 13 which is formed to have a height greater than that of the second detection base 4 is disposed other than the portion opposed to the protrusion 19 in the second detection base 4. The height of the distal end of the slope 20 of the protrusion 19 is formed at a height position of the top surface of the second resistor film 6b formed on the input side of the upper end portion 13.

In addition, when the first detection base 3 is pressed in the vicinity of the outermost edge of the input side, that is, in the vicinity of the protrusion 19 from the input side, the angle ($\theta$) of the slope 20 is set so that the surface resistance value of the first resistor film 6a in the inner surface 3a of the first detection base 3 bent along the slope 20 does not vary greatly from that for the case where the first detection base 3 is not bent. The angle ($\theta$) of the slope 20 is preferably set to $\theta = \tan^{-1} h/L \leq 2.9°$, in which the angle defines an adjacent side (a gap between the base end and the distal end) as "L" and defines the opposite side (the gap between the first resistor film 6a and the second resistor film 6b) as "h".

In the touch panel 2 of the input device 1, unlike the touch panel 2 of the input device 1 according to the first embodiment or the second embodiment, the bonding layer 5 is not disposed to the gap between the first detection base 3 and the second detection base 4.

Next, an operation of the third embodiment will be described.

According to the above-mentioned embodiment, the protrusion 19 includes the slope 20 is inclined to the height position of the top surface of the input side on the second resistor film 6b, in which the contact portion with the inner surface 3a of the first detection base 3 is the base end. With such a configuration, in the vicinity of the protrusion 19, when the first detection base 3 is pressed, the first detection base 3 is bent along the slope 20. Accordingly, it is possible to prevent excessive bending of the first detection base 3.

With such a configuration, according to the embodiment, when the first detection base 3 is pressed from the input side in the vicinity of the outermost edge of the input side, the first detection base 3 is bent along the slope 20 of the protrusion 19 so that the first detection base 3 prevents excessive bending. Accordingly, it is possible to prevent cracking of the first resistor film 6a formed at the bending portion of the first detection base 3.

In addition, the angle (θ) of the slope of the slope 20 is set so that the surface resistance value of the first resistor film 6a of the inner surface 3a in the first detection base 3 does not vary greatly from that for the case where the first detection base 3 is bent along the slope 20. In addition, by setting θ=tan$^{-1}$ h/L≦2.9°, it is possible that the first detection base 3 prevents excessive bending and prevents cracking of the first resistor film 6a in a more secure manner.

In addition, by forming the upper end portion 13 into the resistor film 6b, it is possible to control the gap between the second resistor film 6b and the first resistor film 6a formed at the upper end portion. With such a configuration, by controlling the height of the upper end portion 13, it is possible that the angle of the slope (tan$^{-1}$ θ) of the slope 20 is kept at a predetermined angle.

In addition, the protrusion 19 is attached to the inner surface 4a of the second detection base through the adhesive material 15 so that the touch panel 2 is fixed to the chassis 8. With such a configuration, it is possible to prevent foreign materials from entering to the gap between the touch panel 2 and the chassis in a more secure manner.

In addition, in the top surface 9a of the side portion 9 of the chassis 8, the concave portion 18 which disposes the adhesive material 12 for attaching onto the inner surface 3a of the first detection base 3. With such a configuration, the top surface of the chassis 8 is flush with the input side of the touch panel 2.

The configurations shown in FIGS. 4 and 5 are also provided in FIG. 6. Accordingly, the decoration layer which covers the non-input area (in the embodiment, the non-input area covers the outermost edge in the upper end 13 of the second detection base 4) other than the input area capable of inputting the data of the first detection base 3 may be provided.

The invention is not restricted to the embodiments, and various modifications can be made to the invention.

For example, in the above-described embodiment, the side portion 9 of the chassis 8 is opposed to the all side surfaces of the input panel made of the touch panel 2. The supporting portion 10 of the chassis 8 is opposed to the outer peripheral edge of the bottom surface of the input panel. However, the invention is not restricted to the embodiments. The invention includes the side portion 9 opposed to the side surface of the input panel, a part of the bottom surface and the supporting portion 10, and the input panel.

What is claimed is:

1. An input device comprising:
   an input panel in which a pair of detection bases are opposed to each other and to which data can be inputted by means of an input unit; and
   a chassis that receives the input panel,
   wherein the first detection base disposed on an input side of both detection bases is made of a thin material and has a planar size larger than that of the second detection base disposed on an anti-input side thereof,
   wherein the first detection base and the second detection base are made of a light-transmitting material,
   wherein the chassis includes a side portion opposed to a side surface of the input panel and a supporting portion opposed to a bottom surface of the input panel, and
   wherein the input panel is received in the chassis in a state where an inner surface on the anti-input side of the first detection base is disposed on and opposed to a top surface on the input side of the side portion so as to cover a gap between the side portion and a side surface of the second detection base,
   wherein the gap is covered by a decoration layer,
   wherein a first detector is disposed on the inner surface side of the first detection base and a second detector is disposed on the inner surface side which is the input side of the second detection base,
   wherein a gap in the side portion between the first detector and the second detector is kept at a predetermined size, and a slope inclined toward the inside of the chassis in which the input panel is disposed in the top surface of the side portion, in which a contact portion with the inner surface of the first detection base is a base end of the slope,
   wherein the side portion includes a protrusion that protrudes from the input panel side so as to be disposed in a gap between the inner surface of the first detection base and the inner surface of the second detection base in which the second detector is disposed,
   wherein a part in the second detection base other than the portion opposed to the protrusion includes an upper end portion that has a height greater than that of the other part in the second detection base, and
   wherein the height of the distal end of the slope is set to be a height of the top surface on the input side of the second detector disposed on the upper end portion.

2. The input device according to claim 1, wherein the inner surface of the first detection base is attached to the top surface of the side portion.

3. The input device according to claim 1, wherein the slope is inclined up to the height of the top surface on the input side in the second detector, in which the contact portion with the inner surface of the first detection base is a base end of the slope.

4. The input device according to claim 1, wherein a surface on the anti-input side of the protrusion is attached to the inner surface of the second detection base.

5. The input device according to claim 1, wherein the decoration layer is provided in a non-input area other than the input area of the input panel to which data can be inputted.

6. The input device of claim 1, wherein the decoration layer is disposed on the outer periphery on the anti-input side of the first detection base.

7. The input device of claim 1, wherein the decoration layer is disposed on the outer periphery on the input side of the first detection base.

8. The input device of claim 7, wherein the decoration layer is provided on the outer periphery on a surface on an anti-input side of a decoration film.

9. The input device of claim 8, wherein the decoration film is disposed on the input side of the first detection base.

10. The input device of claim 9, wherein the decoration film has a planar size larger than that of the second detection base.

11. An electronic device comprising:
    an input device, the input device comprising an input panel in which a pair of detection bases are opposed to each other and to which data can be inputted by means of an input unit, and a chassis that receives the input panel,
    wherein the first detection base disposed on an input side of both detection bases is made of a thin material and has a planar size larger than that of the second detection base disposed on an anti-input side thereof,
    wherein the first detection base and the second detection base are made of a light-transmitting material,
    wherein the chassis includes a side portion opposed to a side surface of the input panel and a supporting portion opposed to a bottom surface of the input panel, and
    wherein the input panel is received in the chassis in a state where an inner surface on the anti-input side of the first detection base is disposed on and opposed to a top surface on the input side of the side portion so as to cover a gap between the side portion and a side surface of the second detection base, wherein the gap is covered by a decoration layer,
wherein a first detector is disposed on the inner surface side of the first detection base and a second detector is disposed on the inner surface side which is the input side of the second detection base,
wherein a gap in the side portion between the first detector and the second detector is kept at a predetermined size, and a slope inclined toward the inside of the chassis in which the input panel is disposed in the top surface of the side portion, in which a contact portion with the inner surface of the first detection base is a base end of the slope,
wherein the side portion includes a protrusion that protrudes from the input panel side so as to be disposed in a gap between the inner surface of the first detection base and the inner surface of the second detection base in which the second detector is disposed,
wherein a part in the second detection base other than the portion opposed to the protrusion includes an upper end portion that has a height greater than that of the other part in the second detection base, and
wherein the height of the distal end of the slope is set to be a height of the top surface on the input side of the second detector disposed on the upper end portion.

12. The electronic device according to claim 11, wherein the inner surface of the first detection base is attached to the top surface of the side portion.

13. The electronic device according to claim 11, wherein the slope is inclined up to the height of the top surface on the input side in the second detector, in which the contact portion with the inner surface of the first detection base is a base end of the slope.

14. The electronic device according to claim 11, wherein a surface on the anti-input side of the protrusion is attached to the inner surface of the second detection base.

15. The electronic device according to claim 11, wherein the decoration layer is provided in a non-input area other than the input area of the input panel to which data can be inputted.

16. The electronic device of claim 11, wherein the decoration layer is disposed on the outer periphery on the anti-input side of the first detection base.

17. The electronic device of claim 11, wherein the decoration layer is disposed on the outer periphery on the input side of the first detection base.

18. The electronic device of claim 17, wherein the decoration layer is provided on the outer periphery on a surface on an anti-input side of a decoration film.

19. The electronic device of claim 18, wherein the decoration film is disposed on the input side of the first detection base.

20. The electronic device of claim 19, wherein the decoration film has a planar size larger than that of the second detection base.

21. An input device comprising:
an input panel in which a pair of detection bases are opposed to each other and to which data can be inputted by means of an input unit; and
a chassis that receives the input panel,
wherein the first detection base disposed on an input side of both detection bases is made of a thin material and the second detection base disposed on an anti-input side thereof,
wherein a decoration layer is disposed on the outer periphery on the input side of the first detection base, the decoration layer is provided on the outer periphery on a surface on an anti-input side of a decoration film, the decoration film is disposed on the input side of the first detection base, the decoration film has a planar size larger than that of the second detection base,
wherein the chassis includes a side portion opposed to a side surface of the input panel and a supporting portion opposed to a bottom surface of the input panel,
wherein the input panel is received in the chassis in a state where the surface on an anti-input side of a decoration film is opposed to a top surface on the input side of the side portion so as to cover a gap between the side portion and a side surface of the second detection base,
wherein the gap is covered by the decoration layer,
wherein the chassis includes a slope inclined from the top surface on the input side of the side portion in a direction approaching the second detection base to reach the gap, and the slope is inclined in a direction moving away from the decoration film and the decoration layer, the decoration film being bent along the slope when the decoration film is pressed for an input operation in the vicinity of the outer periphery on the input side of the first detection base, and
wherein a first detector is disposed on the inner surface side of the first detection base and a second detector is disposed on the inner surface side which is the input side of the first detection base.

22. The input device according to claim 21, wherein the decoration layer is provided in a non-input area other than the input area of the input panel to which data can be inputted.

23. An electronic device comprising:
an input device, the input device comprising an input panel in which a pair of detection bases are opposed to each other and to which data can be inputted by means of an input unit, and a chassis that receives the input panel,
wherein the first detection base disposed on an input side of both detection bases is made of a thin material and the second detection base disposed on an anti-input side thereof,
wherein a decoration layer is disposed on the outer periphery on the input side of the first detection base, the decoration layer is provided on the outer periphery on a surface on an anti-input side of a decoration film, the decoration film is disposed on the input side of the first detection base, the decoration film has a planar size larger than that of the second detection base,
wherein the chassis includes a side portion opposed to a side surface of the input panel and a supporting portion opposed to a bottom surface of the input panel,
wherein the input panel is received in the chassis in a state where the surface on an anti-input side of a decoration film is opposed to a top surface on the input side of the side portion so as to cover a gap between the side portion and a side surface of the second detection base,
wherein the gap is covered by the decoration layer,
wherein the chassis includes a slope inclined from the top surface on the input side of the side portion in a direction approaching the second detection base to reach the gap, and the slope is inclined in a direction moving away from the decoration film and the decoration layer, the decoration film being bent along the slope when the decoration film is pressed for an input operation in the vicinity of the outer periphery on the input side of the first detection base, and
wherein a first detector is disposed on the inner surface side of the first detection base and a second detector is disposed on the inner surface side which is the input side of the first detection base.

24. The input device according to claim 23, wherein the decoration layer is provided in a non-input area other than the input area of the input panel to which data can be inputted.

* * * * *